April 10, 1945.　　　　H. BRANDT　　　　2,373,161
WELDER'S UNIT
Filed Dec. 3, 1942　　　　2 Sheets-Sheet 1
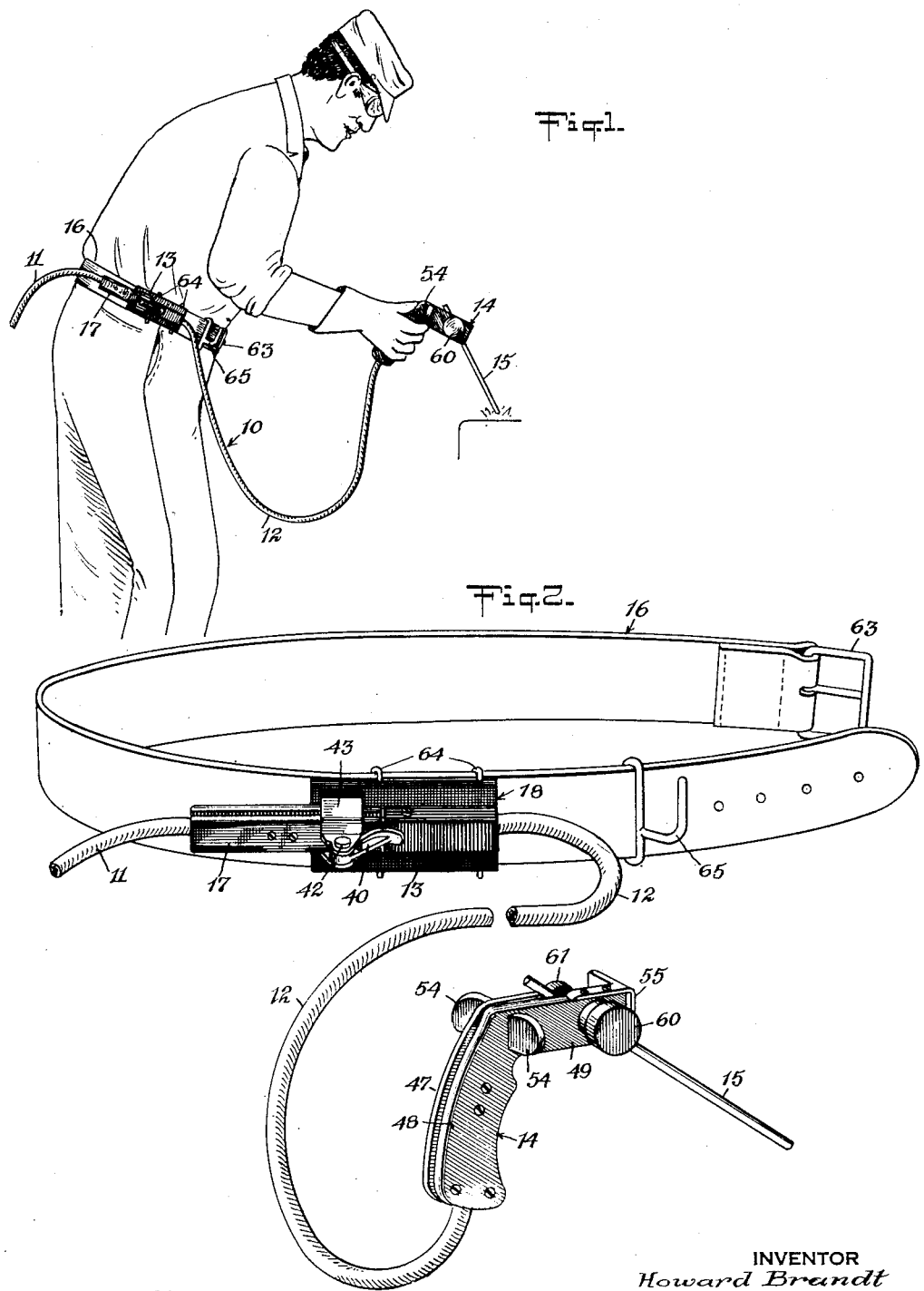
INVENTOR
Howard Brandt
BY
Munn, Liddy & Glaccum
ATTORNEYS April 10, 1945.  H. BRANDT  2,373,161
WELDER'S UNIT
Filed Dec. 3, 1942  2 Sheets-Sheet 2
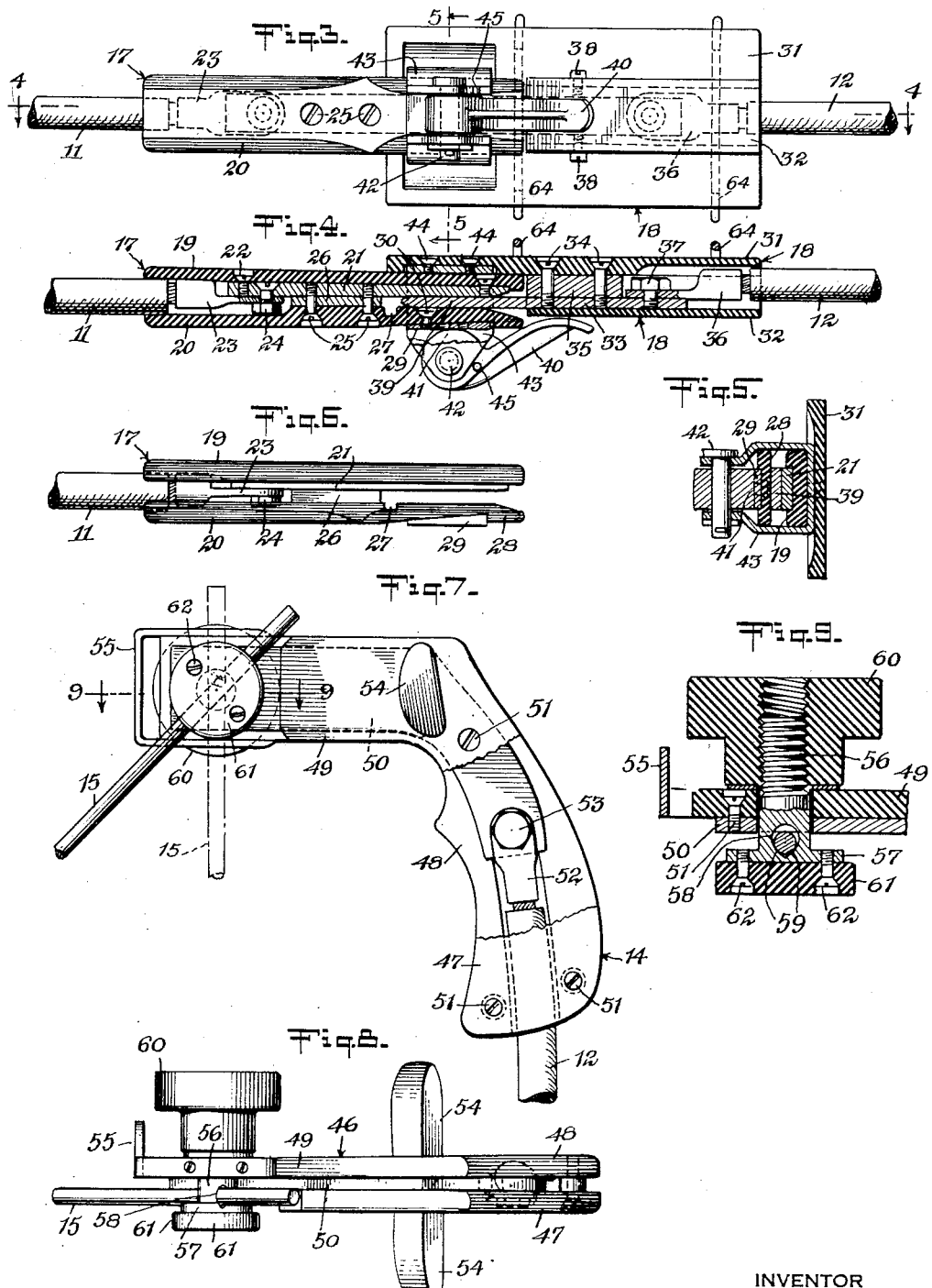
INVENTOR
Howard Brandt
BY
ATTORNEYS Patented Apr. 10, 1945

2,373,161

UNITED STATES PATENT OFFICE 2,373,161

WELDER'S UNIT

Howard Brandt, New York, N. Y.

Application December 3, 1942, Serial No. 467,716

2 Claims. (Cl. 219—8)

This invention relates to a unit which is designed and adapted to be used advantageously by welders for carrying out welding operations.

The invention also relates to the components of a welder's unit by virtue of which a unit of efficient and substantial design is obtained.

Some of the objects and advantages of the present invention are as follows. There is provided a unit, including a device for handling an electric-welding rod, which enables the user to avoid lifting a cumbersome electric current conductor or cable, and to enable the user to go from one welding job to another without carrying along with him a long length of cable leading from a suitable source of electric current to the electrode rod of welding material, to the end that the user will not easily become tired. It provides an efficient and effectual electrical connection from the source of supply of the electric current through the flexible insulated cable to the welding rod which makes contact with the work, thereby giving full voltage and amperage needed and supplying the same steadily and constantly due to the elimination of poor and faulty connections and high resistances. Such elimination prevents burning and pitting of the holder conductors on the handle against which the welding rod has to make its contact and electrical connection. When the welding rod is removed from the handle, it is possible to lay the handle down in any position, upon any object, work or the ground, without causing a short circuit or an electrical contact of the live parts of the handle with anything it is resting on, because of the novel features of the handle.

The handle provides a pistol grip and is otherwise designed that it may be gripped in a comfortable and natural manner by the user over a long period of time without becoming tired in manipulating the handle while carrying out the welding of the work. A welding rod of the largest or smallest cross-sectional size may be held on the handle disposed in any position within an arc of a circle so the user may always hold his hand in a natural straight-forward position while welding.

With the foregoing and other objects in view the invention consists in the construction, arrangement and combination of the parts described in the following specification, defined as to scope in the appended claims, and illustrated by way of example in the accompanying drawings, in which—

Fig. 1 is a view showing the invention in use;

Fig. 2 is a view of the unit detached, and portions thereof being broken away;

Fig. 3 is a side view of the cable splice or coupling;

Fig. 4 is a section of the line 4—4 of Fig. 3;

Fig. 5 is a section on the line 5—5 of Fig. 3;

Fig. 6 is a top view of one section of the splice or coupling;

Fig. 7 is a side view of the welding rod holder and handle, a portion thereof being broken away;

Fig. 8 is a top view of the holder and handle;

Fig. 9 is an enlarged section on the line 9—9 of Fig. 7.

Referring now more particularly to the drawings, it will be apparent from Figs. 1 and 2 that the unit of the invention consists of a sectional insulated electric power cable 10 composed of sections 11 and 12 and a splice or coupling 13 for said sections, a device 14 for holding and handling an electrode rod 15 of suitable welding material, and a supporting means 16 for the cable 10. The splice or coupling 13 is composed of two main sections, there being a section 17 electrically connected with one end of the cable section 11 and a section 18 electrically connected with one end of the cable section 12. The other end of the cable section 12 is electrically connected with the device 14. The remaining end of the cable section 11 is connected with a generator to furnish a suitable source of electric current which is transmitted by the cable 10 to the rod 15 for producing the arc in carrying out the welding operation.

In accordance with the invention, one or the other of the sections of the splice or coupling 13 is adjustably connected with the support 16, and in the present instance the section 18 is so connected, while the other section 17 is detachably yet securely connected with the ssection 18 so that both sections 17 and 18 together with the cable sections 12 and 11 will be carried by the support 16 which is applied to the user of the unit. Therefore, the user need only lift the relatively short cable section 12 instead of a longer and heavier cable and it enables the user to go from one welding job to another without carrying along with him a long length cable leading from the source of electric current. In this connection it is obvious that the device 14, cable section 12, coupling section 18 and the support 16 as a unit stay right on the person of the user as he moves from one job to another. The cable section 11 may be detached whenever desired and allowed to remain connected with the generator.

The splice section 17, shown most clearly in Figs. 4 and 5, is in the nature of a socket element and consists of two blocks or elongated pieces 19 and 20 respectively, of insulating material such as fiber, Bakelite or any other suitable material. An electrode 21 is secured to the piece 19 by screws 22 or the like. The electrode 21 is electrically connected with one end of the cable section 11 in any practical manner, use being made of a terminal 23 on the cable and a bolt and nut 24 in the present instance. A hole in the electrode and the eye of the terminal 23 receive the bolt and the nut threaded on the bolt clamps the terminal 23 tightly against the electrode. The piece 20 is secured to the electrode 21 by screws 25 or the like, there being a spacer 26 between the electrode 21 and said piece 20, and said electrode is disposed between said pieces 19 and 20 lying entirely within the confines thereof due to the fact it is both narrower and shorter than said pieces. The forward ends of the electrode 21 and piece 20 are beveled. A transverse groove 27 in the piece 20 provides a readily flexible portion 28 which has thereon a wear plate 29 held by a screw 30 carried by the portion 28. Said plate 29 is disposed in a wedge shape depression and is adjustable by reason of the extra tapped holes.

The splice section 18 is in the nature of a plug element and in the present instance consists of two blocks or pieces 31 and 32 respectively, of insulating material. The piece 31 is rectangular and is longer and wider than the piece 32. The piece 32 is of channel formation. An elongated electrode 33 is secured to the piece 31 by screws 34 or the like in spaced relation thereto by reason of the spacer 35, also held by the screws 34. One end of the electrode 33 is electrically connected with one end of the cable section 12 by a terminal 36 on said end and a screw 37 which passes through the eye of the terminal 36 in threaded engagement with the electrode 33. The piece 32 is secured in position by screws 38 or the like and extending through the piece 32 in threaded engagement with the spacer 35. One portion of the electrode 33 is housed by the pieces 31 and 32 and a portion 39 of the electrode is exposed for engagement with the forward end of the electrode 21. The portion 39 may be disposed between the electrode 21 and the flexible portion 28.

In order to press the portion 39 of electrode 33 in contact with the electrode 21, there is provided a lever 40 having a cam 41. The lever 40 is fulcrumed by a pivot 42 on a yoke 43 secured to the piece 31 by screws 44 or the like. The lever 40 has limited movement in one direction by means of a stop pin 45 on the lever engageable with a notch in the yoke 43. The cam 41 is adapted to cooperate with the plate 29 when the sections 17 and 18 are brought together to bring the portion 39 of the electrode 33 beside the electrode 21. The piece 19 of the section 17 engages the piece 32 to limit the sliding movement of the section 17 on the section 18. By manipulating the lever 40 forwardly the cam 41 bears on the plate 29 flexing the portion 28 which, in turn, flexes the portion 39 into rigid contact with the electrode 21, thereby forming a good solid electrical contact; thereby achieving electrical conduction from the source of supply of the electric current to the device 14 which holds the welding rod. The cam 41 is so arranged that when disposed in its active position it becomes self-tightening if a pull is exerted rearwardly on the cable section 11.

The device 14 which is designed and adapted for holding the welding rod 15 in carrying out the welding operation, consists of two pieces 46 and 47, respectively, of insulating material such as fiber, Bakelite, or other suitable material. The piece 46 is of angular formation to provide a grip portion 48 and an extension 49 on the portion 48. The piece 47 conforms generally to the grip portion 48. An electrode 50 is secured between the pieces 46 and 47 by screws 51 or the like, which hold the pieces 46 and 47 together. The electrode 50 is connected with the forward end of the cable section 12 by means of a terminal 52 on said end and a fastener 53 which extends through the eye of the terminal 52 and is screwed into the electrode 50. The pieces 46 and 47 are recessed to accommodate the cable section 12. The piece 47 and the portion 48 constitute a pistol grip for the device 14. A thumb rest 54 is arranged on each side of the piston grip, the same being formed integral with the piece 47 and portion 48 respectively, so that the device 14 may be used by a right-handed or left-handed person. The pistol grip, together with the thumb rest, gives the user a confortable grip of the palm and makes it possible to manipulate the device with the extra leverage of the thumb without gripping the handle tightly with the fingers. This allows the fingers to be in a natural position without tension which would cause them to become tired and cramped if used for a long period of time. The forward end of the extension 49 is protected by a metal guard 55 secured thereto in any suitable manner.

In order to effectually hold the welding rod 15 on the handle disposed in any position within an arc of a circle so that the user may always hold his hand in a natural straight-forward position when welding, there is provided a novel means as follows. A screw 56 is provided with a head 57. The screw extends loosely through the extension 49 and the electrode 50, the latter being provided with aligned holes for that purpose. The screw 56 has a hole 58 extending transversely therethrough. The hole 58 has converging walls which form a V shape notch in the inner face of the head 57 extending diametrically thereof. A knurled knob 60 is applicable to the screw 56 and bears against the extension 49. The head 57 has applied thereto a disc 61 of insulating material, the same being secured in place by screws 62 or the like to insulate or protect the screw. The hole 58 in the screw 56 is designed and adapted to receive a welding rod of the largest or smallest cross-sectional size, commonly used, due to the provision of the converging walls 59. When the rod is disposed in the hole 58 transversely of the screw 56 it will lie between the electrode 50 and the head 57 so that when the knob 60 is turned on the screw 56 it will draw the latter axially to effectually clamp the rod in electrical contact with the electrode 50. The welding rod 15 will be positively held in the selected position on the handle because it is securely held between the grooved face of the head 57 and the electrode 50. The V shape hole 58 allows whatever size welding rod is used, to find its bearing on the walls 59 which compensates for its size. The screw 56 may be turned to any desired position of adjustment in order to place the welding rod in the desired position or arc of a circle before drawing the screw up to retain the rod 15 in place. This allows the user to always hold his hand in a natural straight-forward position no matter at what angle he may have to weld, because he is able to turn and set the welding rod at that angle between the straight-forward position of his hand and the position of the work to be welded.

The supporting means 16, in the present instance, consists of a waist-encircling belt having the usual buckle 63. If desired, this belt may be provided with shoulder straps in order to give additional support to the cable 10 and connected parts. The splice or coupling 13 is slidable on the belt 16, and this is accomplished by the provision of loops 64 on the block 31 of the splice section 18. This enables the user to adjust the cable 10 to a position at his side, the front or the back of his body, according to the nature of the work which may require him to stand erect, lie prone, or on his back. The connection of the power cable 10 with the belt 16 is a distinct advantage in sustaining the weight of the cable especially when the welder is working at a place above the ground. The cable section 12 is long enough to allow the user to hold the device 14 at a full arm's length away so as to be able to carry out welding operations in a convenient manner. A hook 65 is slidably engaged with the belt 16 in order to support the device 14 when not in use.

From the foregoing it will be apparent that all of the objects and advantages of the invention may be attained by the unit and counterparts hereinabove described. It is to be understood that the invention is not restricted to the precise construction hereinabove described, but that details of construction may be modified and rearranged within the spirit of the appended claims.

I claim:

1. A welder's tool comprising a handle of non-conducting material, an electrode on the handle, a bolt carried by said handle and extending through said electrode, said bolt having a hole to receive a welding bar so that it extends radially therefrom, and a nut of insulating material on said bolt bearing on the handle to clamp said bar in electrical contact with said electrode.

2. In a welding device, a handle of non-conducting material, an electrode on said handle, a bolt supported by the handle for axial and turning movement with respect to said electrode, said bolt having a transversely extending hole therethrough, and a clamping nut on said bolt, the provision and arrangement of parts being such that an electrode of welding material may be received in said hole and set in any radial position within an arc of a circle with respect to the axis of the bolt and then be securely clamped in the selected position in contact with the first mentioned electrode.

HOWARD BRANDT.